Patented Dec. 20, 1949

2,491,933

UNITED STATES PATENT OFFICE 2,491,933

PROCESS FOR THE MANUFACTURE OF ESTERS OF MONOMETHYLENE ETHERS OF l KETO-2 GULONIC ACID

Antonie H. Ruys, Huizen, and Jan F. Lemmens, Hilversum, Netherlands, assignors to N. V. Chemische Fabriek "Naarden," Naarden, Netherlands No Drawing. Application March 28, 1946, Serial No. 657,890. In the Netherlands August 3, 1943

Section 1, Public Law 690, August 8, 1946
Patent expires August 3, 1963

3 Claims. (Cl. 260—338)

The invention relates to a process for the manufacture of esters of monomethylene ethers of levo keto-2 gulonic acid.

Hitherto only a few representatives of the esters of the monomethylene ethers of levo keto-2 gulonic acid were known, to wit the allylester and the diethylaminoethylester of monoacetonegulonic acid. The substance first mentioned is formed in a small amount as a byproduct in the transformation of diacetonesodiumketogulonate in an aqueous sphere with allylbromide into the allylester of the diacetoneketogulonic acid; the substance last-mentioned is prepared from the corresponding diacetonester by dissolving same in dry ether and subjecting same to the action of hydrochloric acid dissolved in methanol.

It has now been found that esters of the monomethylene-ethers of levo keto-2 gulonic acid can be prepared in a simple and expeditious way with high yields by heating bismethylene ethers of levo keto-2 gulonic acid or their salts and alcohols in the presence of a small amount of an esterifying catalyst, such as sulfuric acid provided that care is taken that in the reaction sphere during the reaction no free water is present, consequently water of hydration liberated during the reaction must be practically immediately removed as well as the water present in the initial products in the early part of the reaction.

The water may e. g. be fixed by a strongly absorbing substance or also a substance reacting quickly with water and being inert with respect to the reacting constituents. The technical execution is preferably carried out in such a manner, that during the reaction a vapor mixture is distilled which at the same time removes the water from the reaction sphere. This removal of water passes off very easily if the alcohol being used for the esterification forms a binary azeotropic mixture with water. If this is not the case or if the composition of the azeotropic vapor mixture is less suitable, one may often successfully add such an auxiliary liquid that the water is expelled in the form of an eventually ternary azeotropic mixture.

The process according to the invention is of special interest for the manufacture of monoacetoneketogulonic acid starting from diacetoneketogulonic acid and alcohols.

The most different alcohols may be used. The removal of the water in the form of a vapor mixture is especially easy if lower aliphatic alcohols, such as ethanol, glycol, propanols, allyl alcohol, butanols and the like are used.

The auxiliary liquids which may be used for obtaining azeotropic vapor mixture in the process according to the invention are distillable organic compounds forming azeotropic vapor mixtures with water and eventually with the alcohol being used and/or with the separating carbonyl compound, and being inert under the circumstances of reaction. Such aliphatic and cyclic hydrocarbons or hydrocarbon mixtures with a relatively low boiling point may, for example, be hexane, benzene, toluene, light benzene fractions, cyclohexane and the like. Another group of suitable auxiliary liquids are the halogenated hydrocarbons of which as an example carbon tetrachloride, trichlorethylene and dichlorethane may be mentioned.

Besides sulfuric acid also other esterifying catalysts may be used such as hydrochloric acid, phosphoric acid, sulphonic acid, pyridine and the like. The catalyst needs only to be added in small amounts. If sulfuric acid is applied mostly additions of fractions of 1% are enough.

As far as it is started from salts of bismethylene ethers of levo keto-2 gulonic acid and as a catalyst an acid is used, the amount of the catalyst may be measured in such a way that at the same time the base being liberated is neutralized. Naturally also another acid may be used for this neutralization.

Though the invention in question is of more practical interest for the manufacture of esters of monoacetoneketogulonic acid it may also be applied with a favorable result to the manufacture of esters of other monomethylene ethers of ketogulonic acid such as esters of the monomethylethylketone compound, of the monocylohexanone compound or of the benzaldehyde compound. Starting from the bismethylene ethers, e. g. from diacetoneketogulonic acid, the alcohol necessary for the transformation according to the invention is preferably applied in excess with respect to the theoretical amount necessary for the esterification, because it is found that by this fact the transformation is accelerated. In the transformation in question besides the esterification of the acid-group also a separation of one of the two carbonyl compound molecules being fixed in the initial compound as methylene ether, takes place; the surprising thing is that for this separation the esterification water formed during the reaction appears to be used.

Consequently the esterification water is not liberated in the reaction sphere. In the case of the diacetoneketogulonic acid the reaction runs as follows:

diacetoneketogulonic acid + alcohol → ester of
   the monoacetoneketogulonic acid + acetone The carbonyl compound separated during the reaction as well as the alcohol being not used and the water eventually liberated in the reaction sphere, are, according to the preferred form of execution, removed from the reaction zone by distillation during the transformation in the form of vapor mixtures.

In applying an auxiliary liquid same also distills from the reaction sphere during the reaction. From the mixtures obtained by this preferably continuous distillation the auxiliary liquid may be separated, e. g. by decantation or in another suitable way after which it is, if required, returned to the reaction zone.

Generally the process according to the invention is carried out at atmospheric pressure. If required one may operate at elevated or reduced pressure. The execution of the process at reduced pressure may be profitable if the auxiliary liquid being used or the alcohol or the carbonyl compound has a relatively high boiling point or is less stable, so that there is danger of decomposition.

In some cases it appears that in the transformation of the bismethylene ethers besides the esters of the monomethylene esters small amounts of the esters of the bismethylene ethers are formed as a by-product; same may however be easily separated from the main product e. g. by crystallization.

The process according to the invention may be profitably executed continuously by passing the reaction components to be transformed, the catalyst and eventually the auxiliary liquid continuously into a heated reaction chamber, connected to a rectifying column, while at the top of the column the vapor mixture is also continuously removed and at the bottom of the reaction chamber the reaction product being formed are removed together with the catalyst.

The compounds obtained according to the invention which for the greater part were unknwon up till now, constiute mostly well crystallizable substances so that same may be easily separated in a pure or practically pure state. They are very valuable as an intermediary product for the preparation of ascorbic acid into which they can be easily transformed.

The invention is elucidated by the following examples, to which the invention is however not limited.

*Example I*

In a flask connected with a long Vigreux rectification column 150 g. of diacetoneketogulonic acid (with a perecentage of anhydrous acid of 93%) is introduced and then 300 cm.$^3$ of absolute ethanol, 500 cm.$^3$ of dry benzene and 3 drops of sulfuric acid of 96%. This mixture is now subjected to a distillation in which first the water of hydration distills in the form of a ternary azeotropic mixture with ethanol and benzene boiling at 64.8° C. In continuing the distillation an anhydrous mixture thereupon distills consisting of ethanol, benzene and acetone, boiling at 68° C. The reaction was continued while continuously checking the acid value of the bottom product till it appeared that more than 95% of the starting acid was transformed into ester. The reaction mixture remaining as bottom product was now exhausted by suction after neutralization of the sulfuric acid being present, with calcium carbonate and then evaporated in a water bath in vacuo, 143 g. of a light colored viscous product were obtained; as appeared from the determination of the percentage of acetone, which corresponded with 104% of that present in the monoacetonester of 100%, this product consisted nearly completely of the ethylester of monoacetone ketogulonic acid. A small amount of the ethylester of the diacetone ketogulonic acid, formed as a by-product could be easily separated because it appeared that same was difficultly soluble in the monoacetonester from which it crystallized. By heating in an acid sphere the ester could be expeditiously transformed into ascorbic acid.

*Example II*

A mixture of 125 g. of diacetoneketogulonic acid (with a percentage of anhydrous acid of 87.5%), 300 cm.$^3$ of n-butanol, 500 cm.$^3$ of dry benzene and 3 drops of sulfuric acid of 96% was subjected to a distillation in the same apparatus as described in Example I in which first a ternary mixture of butanol-benzene-water distilled at 68° C. The treatment of the reaction mixture was carried out in the same manner as indicated in Example I. 121 g. of a thick syrup with an acid percentage of 0.3% free diacetoneketogulonic acid were obtained; this syrup crystallized after some days standing. By recrystallization from petroleum ether long needle-shaped crystals were obtained with a melting point of 62-63° C. consisting of the pure n-butyl-ester of monoacetoneketogulonic acid. By heating with hydrochloric acid the ester could be expeditiously transformed into ascorbic acid.

What we claim is:

1. Process for the manufacture of alkyl esters of monomethylene ethers of levo keto-2 gulonic acid, comprising heating bismethylene ethers of levo keto-2 gulonic acid and aliphatic alcohols in the presence of a small amount of an esterifying catalyst, and removing the free water in the reaction sphere by azeotropic distillation.

2. Process for the manufacture of alkyl esters of monomethylene ethers of levo keto-2 gulonic acid comprising heating bismethylene ethers of levo keto-2 gulonic acid and aliphatic alcohols in the presence of a small amount of an esterifying catalyst and distilling a vapor mixture during the reaction from the reaction-liquid containing the water liberated in the reaction sphere.

3. Process for the manufacture of alkyl esters of monomethylene ethers of levo keto-2 gulonic acid comprising heating bismethylene ethers of levo keto-2 gulonic acid and aliphatic alcohols in the presence of a small amount of an esterifying catalyst and adding an auxiliary liquid to the reaction sphere forming an azeotropic vapor mixture containing as one of its components the liberated water.

ANTONIE H. RUYS.
JAN F. LEMMENS.

REFERENCES CITED

The following references are of record in the file of this patent:

UNITED STATES PATENTS

| Number | Name | Date |
|---|---|---|
| 2,159,191 | Wenner | May 23, 1933 |
| 2,140,480 | Reichstein | Dec. 13, 1938 |
| 2,185,383 | Pasternack et al. | Jan. 2, 1940 |
| 2,301,811 | Reichstein | Nov. 10, 1942 |

FOREIGN PATENTS

| Number | Country | Date |
|---|---|---|
| 459,207 | Great Britain | Jan. 4, 1937 |
| 851,347 | France | Jan. 6, 1940 |